United States Patent
Thompson et al.

(10) Patent No.: US 6,178,416 B1
(45) Date of Patent: Jan. 23, 2001

(54) METHOD AND APPARATUS FOR KNOWLEDGEBASE SEARCHING

(75) Inventors: Kathleen A. Thompson, Belmar, NJ (US); Russ B. Altman, Menlo Park; Oliver M. Duschka, Palo Alto, both of CA (US)

(73) Assignee: James U. Parker, San Diego, CA (US)

( * ) Notice: Under 35 U.S.C. 154(b), the term of this patent shall be extended for 0 days.

(21) Appl. No.: 09/097,849

(22) Filed: Jun. 15, 1998

(51) Int. Cl.⁷ .................................................... G06F 17/30
(52) U.S. Cl. ........................................ 707/3; 707/4; 707/5
(58) Field of Search ........................... 364/200; 395/615; 707/3, 4, 5, 532, 506, 615, 7, 100, 203

(56) References Cited

U.S. PATENT DOCUMENTS

| | | | |
|---|---|---|---|
| 4,823,306 | * 4/1989 | Barbic et al. | 364/200 |
| 5,375,235 | * 12/1994 | Berry et al. | 707/5 |
| 5,386,556 | * 1/1995 | Hedin et al. | 707/4 |
| 5,404,506 | * 4/1995 | Fujisawa et al. | 707/4 |
| 5,619,709 | * 4/1997 | Caid et al. | 707/532 |
| 5,701,466 | * 12/1997 | Yong et al. | 707/100 |
| 5,737,734 | * 4/1998 | Schultz | 707/5 |
| 5,742,816 | * 4/1998 | Barr et al. | 395/615 |
| 5,768,580 | * 6/1998 | Wical | 707/206 |
| 5,802,536 | * 9/1998 | Yoshii et al. | 707/532 |
| 5,819,259 | * 10/1998 | Duke-Moran et al. | 707/3 |
| 5,873,097 | * 2/1999 | Harris et al. | 707/203 |
| 5,920,859 | * 7/1999 | Li | 707/5 |
| 5,926,811 | * 7/1999 | Miller et al. | 707/5 |

* cited by examiner

Primary Examiner—Wayne Amsbury
Assistant Examiner—Thuy Pardo
(74) Attorney, Agent, or Firm—Pennie & Edmonds LLP

(57) ABSTRACT

A library of query templates and a dictionary that relates keywords to more abstract concepts are first prepared on a computer system. Each template contains one or more typed variables. A query is then generated by entering into the system one or more keywords. Each keyword is abstracted to a concept. Advantageously, each concept may be further refined, for example, by additional abstraction, or by picking one concept from several candidates, or by successive abstraction and rejection of different keywords until an acceptable concept is found. Next, for the concepts that are obtained, the system finds all query templates are then instantiated with those concepts or with the keywords used to form the concepts. The user then selects the most appropriate query from among the instantiated query templates. The invention may be practiced in formulating queries to access any set of information sources. It is particularly useful to use the invention to access distributed, heterogeneous databases which do not have a single standardized vocabulary or structure.

6 Claims, 2 Drawing Sheets

METHOD AND APPARATUS FOR KNOWLEDGEBASE SEARCHING

FIELD OF THE INVENTION

This relates to a method and apparatus for searching databases of a variety of types.

BACKGROUND OF THE INVENTION

In today's economies, data is generated, gathered, and stored at an ever-accelerating rate. Financial markets trade with varying stock prices, scientists decode the human genome, patents are filed, and each of these events is reported in some publication, or stored in some database. The ability to access these different sources of information, and to combine them, is becoming crucial for making informed decisions. Ignoring the available information, on the other hand, can result in bad investments, scientific efforts being wastefully repeated, and intellectual property rights being violated. Clearly, the list of advantages of having access to relevant information, and the respective list of disadvantages of not having this information, can be extended ad infinitum.

At the same time, providing access to relevant information is a challenging technical problem. Data is stored in distributed locations and varying formats. It is stored in structured databases, electronic libraries, or even on pages of the World Wide Web. Moreover, different information sources use different vocabularies and have different degrees of credibility.

Information retrieval techniques have been developed to find relevant documents in electronic libraries. These techniques have been widely deployed and refined in order to search for information on the World Wide Web. Users formulate queries by typing in keywords that are related to the information they want to find. For example, if a user is searching for a listing of the law firms in the Palo Alto area, she might provide the keywords "LLP" and "Palo Alto". If the user is lucky, she will retrieve a listing of all law firms in the Palo Alto area. Very likely though she will also have to scan through pages that provide irrelevant information, like news articles about a Palo Alto based software company suing a Seattle based software company. Moreover, relevant information, like a listing of law firms based in neighboring Menlo Park, might not be retrieved.

These retrieval problems are the subject of considerable academic interest. See, for example, the Proceedings of the Annual International ACM SIGIR Conferences on Research and Development in Information Retrieval.

Whereas the problem of guessing a document's relevance given a list of keywords is "just" difficult, searching a structured database by entering keywords is in most cases absolutely impossible. As an example, consider a database that stores all sales transactions of a department store chain. Assume a manager of this company wants to promote the sales clerk that generated the highest revenue in the previous year. In order to find this sales clerk the database system has to scan all sales transactions, add up the sales for each clerk, and find the clerk with the highest amount of total sales. Obviously, searching the database using keywords could never yield an answer to the manager's query.

Database management systems can be queried using sophisticated query languages. These query languages are expressive enough to formulate a query that would answer the manager's question in the previous example. For instance, using the relational query language SQL the query might look as follows:

```
CREATE VIEW Totals AS
    SELECT employee-id, SUM(sales-amount) AS total-sales
    FROM Transactions
    GROUP BY employee-id
SELECT employee-name
FROM Employees, Totals
WHERE Employees.employee-id = Totals.employee-id
    AND total-sales
      >= ALL (SELECT totals-sales FROM Totals)
```

This query accesses just a single database. Data in this database is stored in a single common format. Clearly, query languages that allow formulating queries across multiple databases or across multiple formats, or that allow combining information from structured databases, electronic libraries, and the World Wide Web, are even more complex. Non-technical users, like managers in a department store chain, obviously cannot be expected to formulate their information requests in these complex query languages.

SUMMARY OF THE INVENTION

The present invention describes an approach that allows the formulation of complex queries using a simple keyword-based user interface.

In accordance with the invention, a library of query templates and a dictionary that relates keywords to more abstract concepts are first prepared on a computer system. Each template contains one or more typed variables. A query is then generated by entering into the system one or more keywords. Each keyword is abstracted to a concept. Advantageously, each concept may be further refined, for example, by additional abstraction, or by picking one concept from several candidates, or by successive abstraction and rejection of different keywords until an acceptable concept is found. Next, for the concepts that are obtained, the system finds all query templates that can use those concepts. The variables in the query templates are then instantiated with those concepts or with the keywords used to form the concepts. The user then selects the most appropriate query from among the instantiated query templates.

The invention may be practiced in formulating queries to access any set of information sources. It is particularly useful to use the invention to access distributed, heterogeneous databases which do not have a single standardized vocabulary or structure.

BRIEF DESCRIPTION OF THE DRAWINGS

These and other features and advantages of the present invention will become more readily apparent from the following detailed description, which should be read in conjunction with the accompanying drawings, in which.

DETAILED DESCRIPTION OF THE INVENTION

Figure 1:
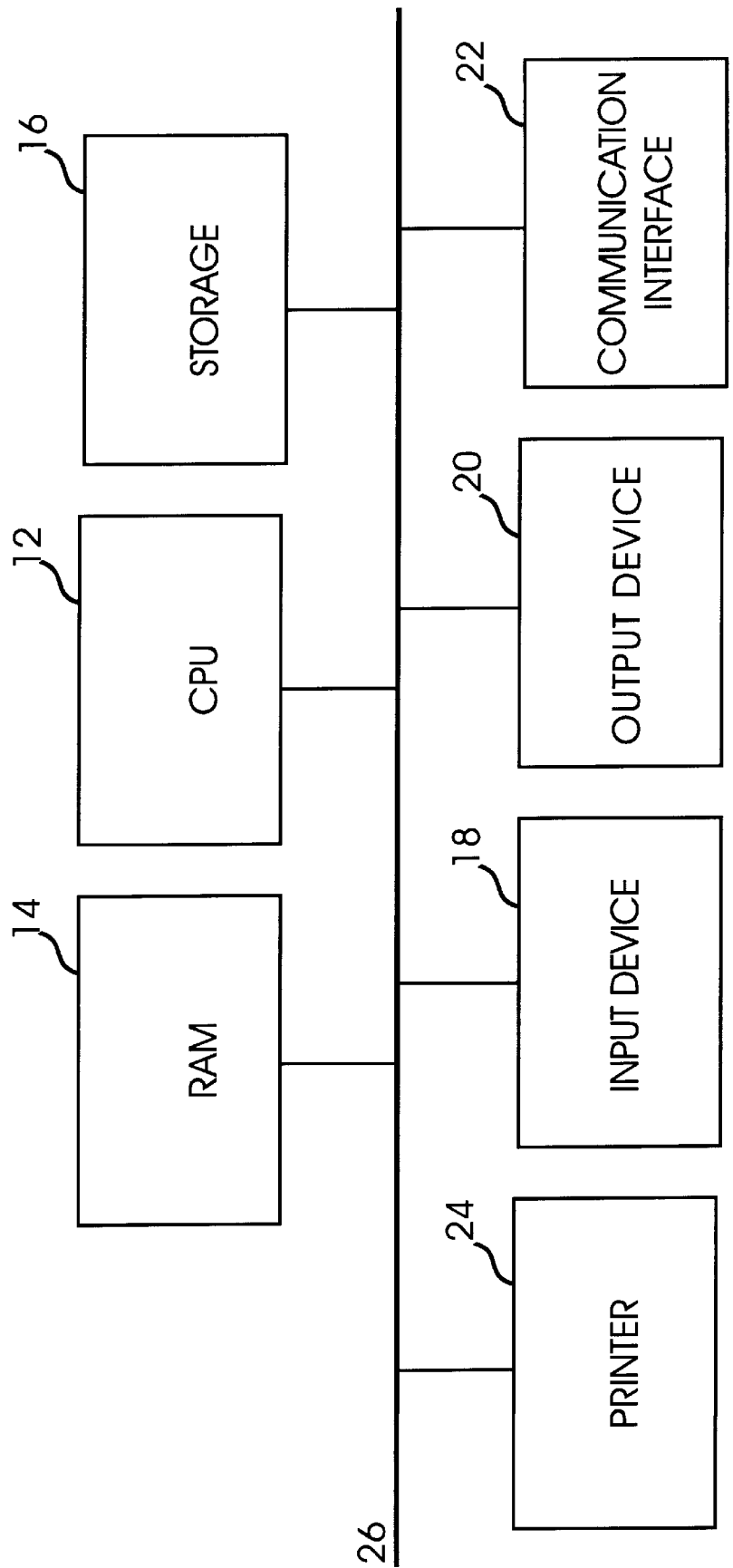
FIG. 1 is a block diagram of a representative computer system on which the present invention may be practiced.

Referring to FIG. 1, there is shown a representative computer system 10 on which the present invention may be implemented. Computer system 10 includes central processing unit ("CPU") 12, memory unit 14, one or more storage devices 16, one or more input devices 18, display device 20, communication interface 22, and printer 24. A system bus 26 is provided for communicating between the above elements.

Computer system 10 illustratively incorporates an IBM-compatible or Apple-compatible personal computer, but one skilled in the art will understand that computer system 10 is not limited to a particular size, class or model of computer. CPU 12 illustratively is one or more microprocessors such as a Pentium™ or Pentium II™ microprocessor available from Intel or a 68000 microprocessor available from Motorola. Memory unit 14 typically includes both some random access memory (RAM) and some read only memory (ROM).

Storage devices 16 illustratively include one or more removable or fixed disk drives, compact discs, DVDs, or tapes. Input devices 18 illustratively include a keyboard, a mouse, and/or other similar device. Display device 20 illustratively is a computer display, such as a CRT monitor, LED display or LCD display. Communication interface 22 may be a modem, a network interface, or other connection to external electronic devices, such as a serial or parallel port. For many applications of the invention, it is anticipated that this interface will include a connection to a local area network and the Internet. Printer 24 is a hard copy output device such as a laser printer, dot matrix printer, or plotter.

The computer system of FIG. 1 is used in accordance with the invention to formulate queries to one or more informational databases stored on storage devices 16 or accessible via communication interface 22 on other storage devices not shown. Software and data used in formulating these queries are preferably stored in one or more storage devices 16. The software is a program which abstracts keywords supplied by a system user and converts them to instantiated query templates from which the user may select one or more queries for use in accessing the information database(s). The data that is stored includes a library of query templates and a database dictionary that relates keywords to concepts.

A keyword is a sequence of characters. For example, the keyword "Ibuprofen" is a sequence of the characters "I", "b", "u", "p", "r", "o", "f", "e", and "n". A concept, on the other hand, is a conceptual or real-life entity. For example, the concept Ibuprofen is a nonsteroidal anti-inflammatory agent with analgesic properties used in the therapy of rheumatism and arthritis. In order to represent concepts in a computer system, a unique identifier or name is assigned to every concept of interest. For example, the concept Ibuprofen might have the unique identifier C020740. For ease of presentation, we will use the word 'concept' in this application to also mean the computer representation of a concept.

Several keywords might refer to a single concept. For example, both the keyword "allergy" and the keyword "hypersensitivity" refer to the same concept. Also, a single keyword might refer to several concepts. The abstraction from keywords to concepts is ambiguous in these cases. For example, the keyword "cold" might refer to the concepts Obstructive Lung Disease, Common Cold, or Cold Temperature.

Concepts can be organized in an "is a"-hierarchy, also called ontology. More specific concepts are related by an "is a" relationship to more general concepts. For example, the concept Asthma has an "is a" relationship with the concept Allergy, and the concept Allergy has an "is a" relationship with the concept Disease. Moving from a more general concept to a more specific concept is called 'refinement'. Moving from a more specific concept to a more general concept is called 'generalization'. In the example, concept Asthma is a refinement of concept Allergy, and concept Disease is a generalization of concept Allergy.

Figure 2:
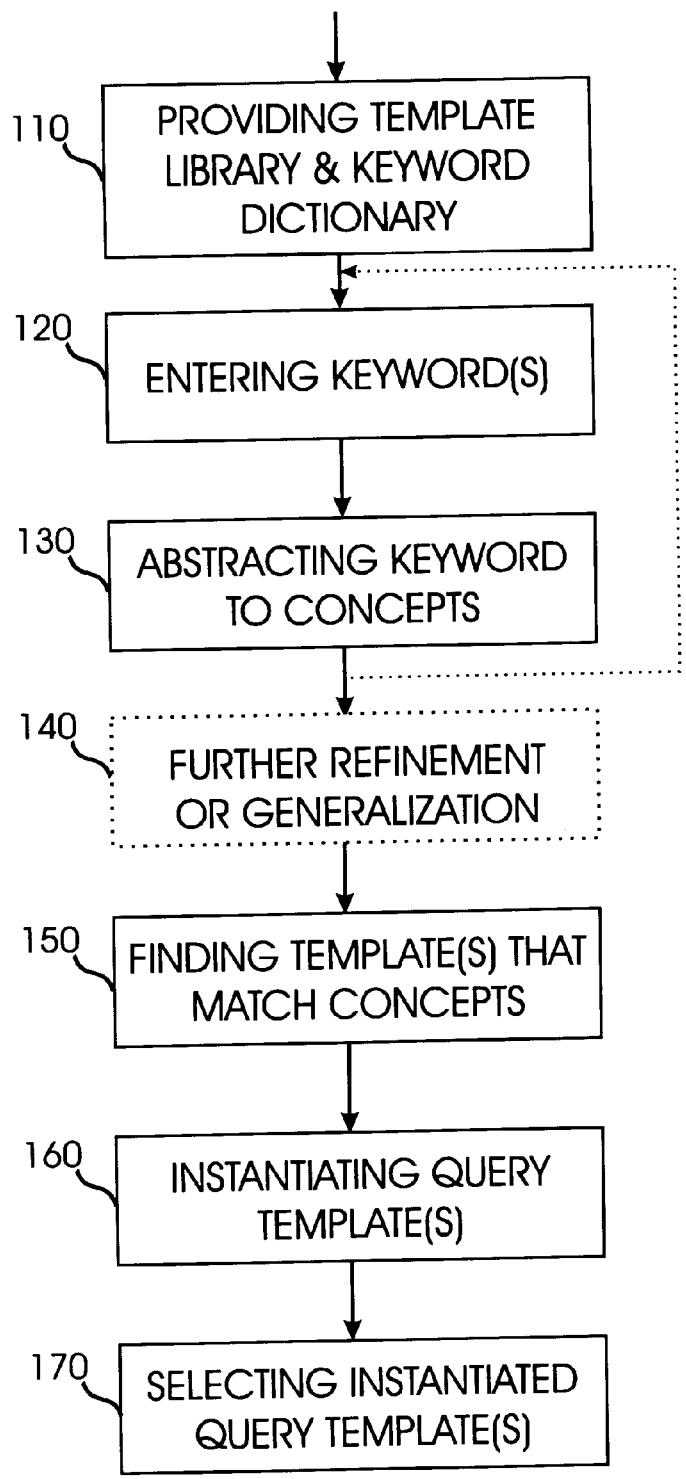
FIG. 2 is a flowchart demonstrating one method of implementing the invention on the computer system depicted in FIG. 1.

A flowchart illustrating the invention is shown in FIG. 2. Step 110 represents the preliminary process of creating a library of query templates and a database dictionary which associates keywords with more general concepts. The library and database dictionary are stored in one or more storage devices 16 of the computer system.

Each of the query templates in the library comprises three entries:

(i) A textual presentation of the query template with variables. This textual presentation, with variables being instantiated, is shown to the user. The variables in the textual presentation are typed, meaning that only certain instantiations of the variables are allowed.

As an example, consider the following textual presentation with typed variables X and Y:

Can X be used to treat Y?

X: Pharmacologic Substance

Y: Symptom

Ibuprofen and Lower Back Pain are possible instantiations of X and Y, respectively, because Ibuprofen is a Pharmacologic Substance and Lower Back Pain is a Symptom. The instantiated textual presentation in this example is:

Can Ibuprofen be used to treat Lower Back Pain?

On the other hand, Lower Back Pain and Ibuprofen is not a possible instantiation of X and Y respectively, because Lower Back Pain is not a Pharmacologic Substance, and Ibuprofen is not a Symptom. As can be seen, the typing of the variables makes it possible to distinguish between useful queries like "Can Ibuprofen be used to treat Lower Back Pain" and nonsense queries like "Can Lower Back Pain be used to treat Ibuprofen?"

(ii) A mapping from the instantiations of the variables in (i) to queries. The queries might be formulated in a database query language like SQL or OQL. More generally, queries are any kind of executable computer code, like PERL scripts or C++ programs that gather information from databases or other information sources. The execution of the generated query is supposed to gather and process all the information in the same way a human expert would do in order to answer the question asked in (i).

The simplest form of a mapping from instantiations to query plans is a textual replacement in a predefined database query. Continuing with the previous example, the following might be a predefined SQL query:

SELECT effectiveness

FROM DrugInformation

WHERE drug='X' AND symptom='Y'

A textual replacement of X by Ibuprofen and Y by Lower Back Pain yields the following SQL query:

SELECT effectiveness

FROM DrugInformation

WHERE drug='Ibuprofen' AND symptom='Lower Back Pain'

This query could be sent to a database with a relation named "DrugInformation" that has at least the three attributes "drug", "symptom", and "effectiveness". The query would gather all information known on the effectiveness of Ibuprofen to treat Lower Back Pain.

(iii) Statistical information for ranking different matching query templates. This information might include the computational cost of executing the query plan, the cost of accessing the information sources required for executing the query plan, usage patterns, user preferences or user privileges.

A typical keyword dictionary is a thesaurus which relates specific words to more general concepts. This dictionary advantageously is hierarchical with several levels of increasing abstraction. An illustrative such dictionary is the Metathesaurus and Semantic Network described below.

To formulate a query, a user enters one or more keywords at step 120. Illustratively, the queries are entered into the computer system using a keyboard and correct entry is confirmed via display device 20. Advantageously, a graphic user interface is used to facilitate the entry of the keywords.

The system then proceeds at step 130 to abstract the keywords(s) into one or more concepts. Where the keyword is associated with multiple concepts, the system advantageously presents the user with a listing of at least the most likely concepts and the user has the opportunity at step 140 to further refine his entry by selecting the most appropriate concept. Preferably, the presentation of alternative concepts is in ranked order where the ranking is determined by pre-specified criteria. One such criterion is frequency of selection during previous uses of the database dictionary.

As suggested in FIG. 2, the abstraction process may involve multiple steps. For example, as indicated by the loop around step 130, a keyword may be abstracted into a concept and the concept may be further abstracted into a higher level concept. As indicated by the loop around steps 120 and 130, the process may involve the successive entry of different keywords, the abstraction of each keyword in turn, and a selection from the resulting concepts of the one concept that is deemed most appropriate.

Following selection of the concepts, the concepts are then matched at step 150 with the templates to identify those templates that can accept the selected keywords and concepts. Matching is performed by checking the library of query templates to determine if any templates have variables that will accept the concepts that have been abstracted from the keywords.

The templates that are identified are then instantiated with the keywords and/or concepts at step 160 and the instantiated templates are presented to the user. Advantageously, the presentation is made via a display and a graphical user interface; and the instantiated templates are presented in a ranked order determined by pre-specified criteria. Several possible criteria have been described above.

Finally, at step 170, the user selects one or more of the instantiated query templates for further use as a query to the information sources that are stored in storage devices 16 or that are accessible through communication interface 22.

The invention may be practiced with all manner of dictionaries and ontologies. A particularly useful context in which the invention may be practiced is in formulating queries using the Unified Medical Language System (UMLS). This system includes a Metathesaurus, a Semantic Network, an Information Sources Map and a SPECIALIST lexicon. The Metathesaurus integrates more than thirty biomedical thesauri and its most recent release contains over 330,000 concepts that are named by more than 739,000 terms. The Semantic Network contains 135 semantic types and 51 relationships. The Metathesaurus contains information for abstracting keywords to concepts, and for refining and generalizing concepts. The Semantic Network is useful for providing the types and supertypes used in the query templates.

UMLS was developed between 1986 and 1994 under the sponsorship of the National Library of Medicine. Considerable information about UMLS is available at the National Library of Medicine's web site: www.nlm.nih.gov. UMLS is also featured in a recent issue of the Journal of the American Medical Informatics Association, Vol. 5, No. 1, (January/February 1998). See, especially, B. L. Humphreys et al., "The Unified Medical Language System: An Informatics Research Collaboration," pp. 1–11; M. Joubert et al., "UMLS-based Conceptual Queries to Biomedical Information Databases: An Overview of Project ARIANE," pp. 52–61, both of which are incorporated herein by reference.

An illustrative example of how the present invention might use UMLS to formulate queries is as follows. An illustrative graphical user interface for use in this application is set forth in Table I.

TABLE I

| ADD | SELECT | GENERALIZE | REFINE | DELETE | RESET |
|---|---|---|---|---|---|

The interface includes at least a display area and a row of user selectable "keys." The display area is a workplace which displays information that the user is working with including an entry from the keyboard. The user selected keys typically are used by a mouse-controlled cursor and permit the user to manipulate the contents of the display. Illustratively, the keys include an ADD key which adds an additional concept to the query, a SELECT key which enables the user to select one or more alternatives presented on the screen, a GENERALIZE key which enables the user to instruct the system to generalize a concept displayed on the screen, a REFINE key which enables the user to refine a concept, a DELETE key which enables the user to delete a concept, and a RESET key which returns the user to the starting point for new keyboard entry.

In the case of UMLS, the Metathesaurus provides the keyword dictionary that relates keywords to concepts. This is available from the National Library of Medicine and preferably is stored in a storage device in the user's computer system, or on a server accessible through a local area network or the Internet. The library of query templates advantageously is prepared by a system administrator to accommodate the particular needs of a company or it is obtained from commercial sources.

We will consider by way of example the formulation of a query about respiratory disorders. The use starts by typing in "cold." This is displayed on the graphical user interface as shown in Table II.

TABLE II

| COLD |
|---|

| ADD | SELECT | GENERALIZE | REFINE | DELETE | RESET |
|---|---|---|---|---|---|

To enter this keyword, the user selects the ADD key.

In response, the system abstracts the keyword "cold" and presents the abstraction to the user for his consideration. Since "cold" is a very general term, there are several possibly relevant concepts and all of these are presented to the user as illustrated in Table III.

TABLE III

| ☐ CO 24117 (Lung Diseases, Obstructive) |
| ☐ CO 09443 (common cold) |
| ☐ CO 09264 (cold temperature) |

| ADD | SELECT | GENERALIZE | REFINE | DELETE | RESET |
|---|---|---|---|---|---|

The numbers that are prefixed to each concept are concept numbers used in the Metathesaurus. To select one of these concepts, the user uses the cursor to mark "Common Cold" and then selects the SELECT key.

The system returns a screen which includes a detailed description of the common cold. This description is the contents of the Metathesaurus entry on the common cold.

To further develop the query, the user then selects the GENERALIZE key. The system returns the screen shown in Table IV.

TABLE IV

| ☐ CO 42769 (virus disease) |
| ☐ CO 35204 (respiration disorder) |

| ADD | SELECT | GENERALIZE | DEFINE | NEXT | DELETE |

To select one of these concepts, the user uses the cursor to mark "respiration disorders" and then selects the SELECT key.

The system returns a screen with a detailed description of respiration disorders obtained from the Metathesaurus.

To further develop the query, the user decides to make an additional entry. He types in "melatonin" and then selects the ADD key. This gives the system enough information to make a match with an available query template.

Accordingly, the system returns the screen set forth in Table V.

TABLE V

| ☐ Respiration Disorder |
| ☐ Melatonin |
| ☐ Is respiration disorder affected by melatonin? |

| ADD | SELECT | GENERALIZE | DEFINE | NEXT | DELETE |

This, however, is not what the user has in mind, so he uses the cursor to mark "melatonin" for further development and selects the REFINE key.

The system proceeds to display more detail about melatonin by returning on the screen of Table VI a list of Different types of melatonin.

TABLE VI

| ☐ Respiration disorder |
| ☐ Melatonin |
| ☐ 2 - phenylmelatonin |
| . |
| . |
| . |
| ☐ 2 - iodomelatonin |
| ☐ 2 - chloromelatonin |
| ☐ Is respiration disorder affected by melatonin |

| ADD | SELECT | GENERALIZE | REFINE | DELETE | RESET |

One of these is of interest to the user and so he uses the cursor to mark both "respiration disorder" and "2 phenylmelatonin" and selects the SELECT key.

Again, this gives the system enough information to attempt to make a match with a query template. Accordingly, the system searches the query templates for a possible match.

Upon making the search, the system finds a match and proceeds to instantiate the query template with the terms "respiration disorder" and "2-phenylmelatonin." It then returns the screen of Table VII.

TABLE VII

| ☐ Respiration disorder |
| ☐ 2 - phenylmetonin |
| ☐ Is respiration disorder affected by 2-phenylmelatonin? |

| ADD | SELECT | GENERALIZE | DEFINE | NEXT | DELETE |

This completes the formulation of the query and the user may then use the query to access information stored in the databases of interest to him.

To formulate a new query, the user selects the RESET key.

As will be apparent to those skilled in the art, numerous variations of the invention may be practiced within he scope of the invention.

What is claimed is:

1. A method of generating a query to one or more information sources comprising the steps of:
   providing a library of query templates with concepts as variables;
   entering one or more keywords;
   for each keyword that is entered, abstracting said keyword to a concept;
   finding all query templates that match the concepts that are abstracted;
   for each query template that matches, instantiating the query template with the concepts that matched the template or with the keywords that were abstracted into concepts that matched the template;
   ordering the relevance of instantiated query templates using one or more of the following ranking criteria:
   frequency of usage by a user or a user group,
   modeling of user preferences and user privileges,
   computational cost of executing the query,
   cost of accessing the information sources required for executing the query; and
   selecting one or more of the instantiated query templates.

2. A method of generating a query to one or more information sources comprising the steps of:
   providing a library of query templates with semantic types as variables;
   entering one or more keywords;
   for each keyword that is entered, abstracting said keyword to a concept;
   for each concept, categorizing said concept into a semantic type;
   finding all query templates that match the semantic types;
   computing supertypes of the semantic types, and finding query templates that match the supertypes;
   for each query template that matches, instantiating the query template with the keywords or concepts that produced the semantic types that matched the template; and
   selecting one or more of the instantiated query templates.

3. A method for ordering the relevance of queries generated by the method of claim 2 using one or more of the following ranking criteria:
   closeness of the supertypes in the query template to the semantic types derived from the entered keywords;
   relationship of the semantic types in the query template to semantic types in other query templates.

4. A method of generating a query to one or more information sources comprising the steps of:
   providing a library of query templates with semantic types as variables;

entering one or more keywords;

for each keyword that is entered, abstracting said keyword to a concept;

for each concept, categorizing said concept into a semantic type;

finding all query templates that match the semantic types;

for each query template that matches, instantiating the query template with the keywords or concepts that produced the semantic types that matched the template;

ordering the relevance of instantiated query templates using one or more of the following ranking criteria:
frequency of usage by a user or a user group,
modeling of user preferences and user privileges,
computational cost of executing the query,
cost of accessing the information sources required for executing the query (per usage fees, etc.); and selecting one or more of the instantiated query templates.

5. A method for generating a query to one or more information sources comprising the steps of:

providing a library of query templates with semantic types defined in the Unified Medical Language System Semantic Network as variables;

entering one or more keywords;

for each keyword that is entered, abstracting said keyword to a concept defined in the Unified Medical Language System Metathesaurus;

for each concept that is abstracted, categorizing said concept into a semantic type defined in the Unified Medical Language System Semantic Network;

finding all query templates that match said semantic types;

for each query template that matches, instantiating the query templates with the keywords or concepts that produced the semantic types that matched the template;

ordering the relevance of instantiated query templates using one or more of the following ranking criteria:
frequency of usage by a user or a user group,
modeling of user preferences and user privileges,
computational cost of executing the query,
cost of accessing the information sources required for executing the query (per usage fees, etc.); and selecting one or more of the instantiated query templates.

6. A method for generating a query to one or more information sources comprising the steps of:

providing a library of query templates with semantic types defined in the Unified Medical Language System Semantic Network as variables;

entering one or more keywords;

for each keyword that is entered, abstracting said keyword to a concept defined in the Unified Medical Language System Metathesaurus;

for each concept that is abstracted, categorizing said concept into a semantic type defined in the Unified Medical Language System Semantic Network;

finding all query templates that match said semantic types;

computing supertypes of the semantic types and finding query templates that match the supertypes;

for each query template tat matches, instantiating the query templates with the keywords or concepts that produced the semantic types that matched the template;

ordering the relevance of instantiated query templates using one or more of the following ranking criteria:
closeness of the supertypes in the query template to the semantic types derived from the entered keywords, and
relationship of the semantic types in the query template to semantic types in other query templates; and selecting one or more of the instantiated query templates.

* * * * *